Dec. 1, 1970   F. STASTNY ET AL   3,543,460
FIRE-RESISTANT COMPOSITE ELEMENTS CONTAINING
INTERNAL LAYERS OF EXPANDED PLASTICS
Filed Feb. 17, 1969

INVENTORS:
FRITZ STASTNY
RUDOLF BREU
UDO HAARDT
BY
Johnston, Root, O'Keeffe, Keil, Thompson & Shurtleff
ATT'YS United States Patent Office 3,543,460
Patented Dec. 1, 1970

3,543,460
FIRE-RESISTANT COMPOSITE ELEMENTS CONTAINING INTERNAL LAYERS OF EXPANDED PLASTICS
Fritz Stastny, Ludwigshafen, Rudolf Breu, Lambsheim, and Udo Haardt, Ludwigshafen, Germany, assignors to Badische Anilin- & Soda-Fabrik Aktiengesellschaft, Ludwigshafen (Rhine), Germany
Filed Feb. 17, 1969, Ser. No. 799,861
Claims priority, application Germany, Feb. 22, 1968, 1,658,806
Int. Cl. E04c 2/04, 2/28
U.S. Cl. 52—232         3 Claims

ABSTRACT OF THE DISCLOSURE

A fire-resistant composite element consisting of a centrally arranged water-containing alkali metal silicate sheet to each side of which an organic expanded plastics layer is applied which in turn is covered by an incombustable outer layer. At least two of the lateral faces are likewise covered with an incombustible material which also serves as a spacer for the incombustible outer layers and positions the alkali metal silicate sheet. A key which engages the composite element permits two or more such elements to be combined.

---

Figure 1:
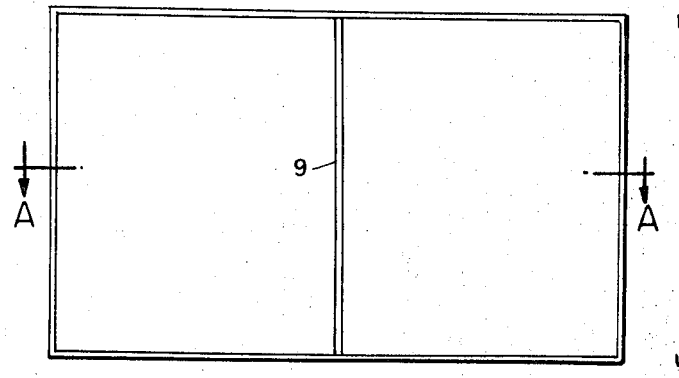

This invention relates to fire-resistant composite elements containing internal layers of expanded plastics.

Composite elements are used in large quantities in building construction. They are sheet materials composed of several layers.

Such compound elements, particularly when used as facing panels or partitions, are often required to conform to certain requirements with respect to their heat-insulation properties. For instance, exterior wall panels must offer a specific minimum resistance to the transmission of heat. Such panels therefore usually contain one layer consisting of a material of low heat conductivity. In practice generally preferred materials of this kind are closed-cell expanded plastics based for instance on polystyrene or polyurethanes. These materials possess satisfactory mechanical properties, a low density, for instance between 20 and 30 kg./m.$^3$, as well as a low over-all heat transfer coefficient (rated at 0.035 kcal./(m.$^2$)(h.) (° C. at 10° C.). Frequently composite elements must also be resistant to fire. Elements having cores of expanded organic plastics cannot satisfy the requirements of fire resistance for prolonged periods of time because the thermal stability of expanded plastics is low and they are rapidly destroyed when exposed to heat and thus lose their insulating properties.

Even in the case of very thick composite elements, for instance with an expanded plastics layer 50 mm. thick, the temperature rise on the side facing away from a fire is so high that such elements cannot be regarded as fire resistant.

Fire-resistant sheets are also known which are made of alkali metal silicates, particularly sodium silicates, and which have a water content of 20 to 70% by weight. These sheets also contain fibers, particularly glass fibers, such as chopped strands, in quantities between 2 and 40, preferably 5 to 25 percent by weight related to the anhydrous alkali metal silicate they contain. Such fiber and water containing alkali metal silicate sheets have the property, when exposed to high temperatures such as occur when a fire breaks out, of expanding to form mechanically resistant layers having excellent heat-insulating properties, the water being evaporated.

The object of the present invention is to provide a composite element containing internal expanded organic plastics layers covered by mechanically resistant non-combustible external layers and being resistant to fire for prolonged periods.

It has been found that this object is achieved by a composite element comprising a central layer consisting of a water-containing alkali metal silicate sheet to each side of which a layer of expanded organic plastics is applied and covered with a non-combustible outer layer, at least two of the lateral peripheral faces on opposite sides not covered by the non-combustible outer layers being covered by a mechanically stable incombustible material which serves to centrally locate the alkali metal silicate sheets and at the same time to space the two outer layers.

The water-containing alkali metal silicate sheets which contain between 20 and 70 percent by weight of water usually have a thickness of about 2 to 4 mm. When exposed to heat they foam and form an expanded plastics layer. Preferably they contain fibers, particularly glass fibers, such as chopped strands, since this improves the mechanical stability of the foam and also assists in the production of a homogeneous foam.

Suitable organic foams for the expanded plastics layers may consist for example of polymers of styrene and its copolymers, polymers of vinyl chloride and its copolymers, vinylidene chloride and its copolymers, or polymers based on phenolic resins or polyurethanes.

When a composite element according to the invention is exposed to a flame, the non-combustible outer layer facing the fire, which may consist of absestos cement, vitrified asbestos cement, aluminum in combination with asbestos cement, steel sheet and the like, first bursts. The expanded organic plastics layer melts, ignites and burns. At the same time the alkali metal silicate sheets expand and, depending upon their original thickness, they form a 10 to 20 mm. thick expanded layer. This has such a good insulating effect that the next expanded organic layer behind, consisting for instance of polystyrene, will not melt or be destroyed for a long period of time, so that its insulating effect is preserved.

Careful tests have confirmed that it is much better to sandwich the alkali silicate boards between the two organic expanded plastics layers and not to place one on each side of these layers as would also be possible. Surprisingly, the proposed arrangement remains fire-resistant for a much longer time although only one alkali metal silicate sheet is embedded in the composite element.

Figure 2:
Figure 3:
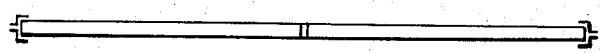
Figure 4:
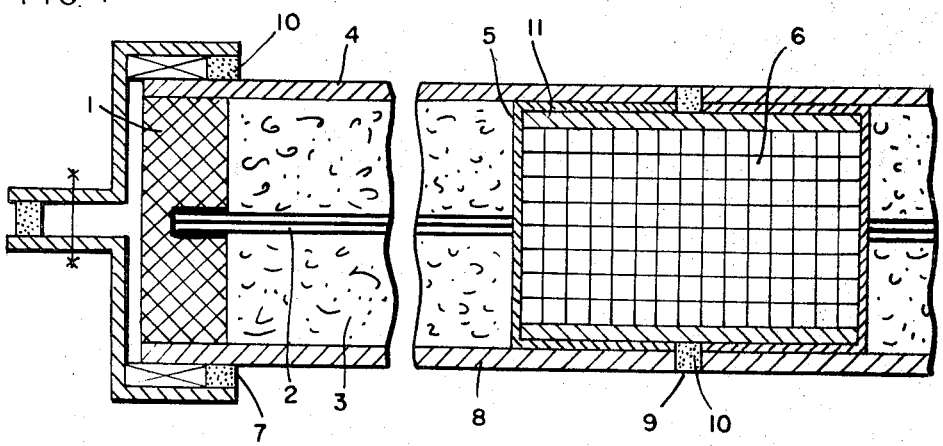

A composite element according to the invention is shown diagrammatically and by way of example in the accompanying drawings in which FIG. 1 is a plan view, FIGS. 2 and 3 are side views and FIG. 4 is a section taken on the line A—A.

1 is a spacer in the form of an asbestos cement sheet that is 5 to 30, e.g. 25, mm. thick framing the composite element on 3 sides. Machined into the center of this spacer around its inside periphery is a groove, about 15 mm. deep and 4 mm. wide, for the reception of two inorganic fire-resisting sheets 2 that have been coated with an adhesive. A fire-resisting sheet is 1.5 to 2 mm., say 1.7 mm. thick, has a water content of 50% by weight and contains chopped strands in quantities of 7.5% by weight related to the anhydrous alkali metal silicate it contains.

Adhesively applied to the sides of the fire-resisting sheets are expanded plastics sheets 3 of polystyrene. These are 5 to 100 mm., say 20 mm. thick. The outer layers 4 consist of asbestos cement sheets or vitrified asbestos cement sheets 8 that are 2 to 20 mm., say 3.2 mm. thick.

Two such composite elements are keyed together along a vertical joint 9 in the center. The key is separated from the core layer of the elements by two U-sections 5 consisting of incombustible material, such as asbestos. The U-section is preferably adhesively bonded both to the core and to the key.

In the event of a fire this arrangement prevents gases from escaping through the center joint from the side facing away from the fire. The key itself consists of asbestos cement sheets 11 and a mineral fiber sheet 6. The joint is sealed with an elastic heat-resistant cement 7, such as one based on silicon and rubber.

The entire composite element is mounted in a frame consisting of two Z-sections. The gap 10 between these sections and the outer layers of the composite element is sealed with a heat-resistant cement. In a fire test performed in a furnace in which the tempearture in the flame chamber rose to 659° C. in 10 minutes, to 821° C. in 30 minutes and to 986° C. in 90 minutes, an average temperature rise of 140° C. above room temperature was not measured on the side of the composite element facing away from the fire until 86 minutes had passed. Duirng exposure to the flame gases do not issue from the side of the element facing away from the fire. Even the center joint stayed tight throughout the test.

Owing to the presence of the peripheral spacer the element does not contract at the edges during the fire test. After the fire test it was found that the alkali metal silicate sheet in the element had expanded to form an expanded layer which was not arched and which was firmly anchored in the peripheral slot of the spacer.

In another fire test in which the temperature in the flame chamber rose to 659° C. in 10 minutes and then remained constant, an average temperature rise of 95° C. above room temperature was measured after 90 minutes at 5 points on the surface of the composite element facing away from the fire. This temperature is still substantially below the permissible temperature which is considered to be 140° C. above room temperature. Again no flammable gases appeared on the side of the composite element facing away from the fire. The joints remained closed.

The composite element shown in the drawings which consists of two sections held together by a key may naturally consist of any desired number of sections. The outside composite elements will then be covered on three of their side faces by spacers, whereas the sections in the middle will be provided with spacers on only two opposite side faces. The two other edges form a groove for a key. Conveniently, as has been described, the key is covered on both sides by a U-section consisting of an incombustible material. This ensures a tight seal and prevents combustible gases evolving in the expanded organic layer on the side facing the fire from issuing from the side of the element facing away from the fire and thereby favoring the spread of the fire.

Naturally the element might also consist of only one part in which case the faces of all four edges would be covered by the spacer.

We claim:
1. A fire-resistant composite element comprising internal expanded organic plastics layers and mechanically stable non-combustible external layers, comprising a central layer consisting of a water-containing alkali metal silicate sheet to each side of which a layer of an expanded organic plastics is applied and covered with a non-combustible outer layer, at least two of the side faces on opposite sides not covered by the non-combustible outer layers being covered by a mechanically stable incombustible material which serves centrally to locate the alkali metal silicate sheets and at the same time to space the two outer layers.

2. A fire-resistant composite element as claimed in claim 1, wherein the alkali metal silicate sheets and the two layers of expanded organic plastics are set back in relation to the two outer layers at the side faces of the composite element that are not covered with the mechanically stable and incombustible material and in that the groove thus formed receives one side of a key of incombustible material of which the other side is received into the corresponding groove in the side face of another compound element.

3. A fire-resistant composite element as claimed in claim 2 wherein the key and the groove are sealed by a U-section of heat-resisting material which embraces the key.

References Cited

UNITED STATES PATENTS

| | | | |
|---|---|---|---|
| 1,415,222 | 5/1922 | Cramer | 52—604 X |
| 3,255,559 | 6/1966 | Gaeth et al. | 52—309 X |
| 3,336,710 | 8/1967 | Raynes | 52—309 |
| 3,426,491 | 2/1969 | Gaeth et al. | 52—232 X |
| 3,466,222 | 9/1969 | Curtis | 52—232 X |

FOREIGN PATENTS

| | | |
|---|---|---|
| 920,043 | 3/1963 | Great Britain. |
| 1,084,503 | 9/1967 | Great Britain. |

ALFRED C. PERHAM, Primary Examiner

U.S. Cl. X.R.

52—309, 457; 161—44, 161, 403